(12) United States Patent
Ambrosi et al.

(10) Patent No.: US 10,487,958 B2
(45) Date of Patent: Nov. 26, 2019

(54) VALVE ARMATURE FOR A SOLENOID VALVE, AND VALVE CARTRIDGE FOR A SOLENOID VALVE

(71) Applicant: Robert Bosch GmbH, Stuttgart (DE)

(72) Inventors: Massimiliano Ambrosi, Benningen (DE); Edgar Kurz, Heilbronn-Horkheim (DE); Norbert Alaze, Markgroeningen (DE); Michael Eisenlauer, Affalterbach (DE)

(73) Assignee: Robert Bosch GmbH, Stuttgart (DE)

( * ) Notice: Subject to any disclaimer, the term of this patent is extended or adjusted under 35 U.S.C. 154(b) by 9 days.

(21) Appl. No.: 15/507,367

(22) PCT Filed: Aug. 3, 2015

(86) PCT No.: PCT/EP2015/067774
§ 371 (c)(1),
(2) Date: Feb. 28, 2017

(87) PCT Pub. No.: WO2016/034347
PCT Pub. Date: Mar. 10, 2016

(65) Prior Publication Data
US 2017/0307101 A1    Oct. 26, 2017

(30) Foreign Application Priority Data
Sep. 1, 2014 (DE) .................. 10 2014 217 447

(51) Int. Cl.
*F16K 31/06* (2006.01)
*B60T 13/68* (2006.01)
*B60T 8/36* (2006.01)

(52) U.S. Cl.
CPC ........ *F16K 31/0696* (2013.01); *B60T 13/686* (2013.01); *F16K 31/0655* (2013.01); *F16K 31/0665* (2013.01); *B60T 8/363* (2013.01)

(58) Field of Classification Search
CPC ............ F16K 31/0662; F16K 31/0665; F16K 31/0696; B60T 8/363; B60T 8/366
See application file for complete search history.

(56) References Cited

U.S. PATENT DOCUMENTS 3,213,524 A * 10/1965 Prather .................. F16K 27/00
251/357
6,328,276 B1 * 12/2001 Falch .................. F16K 31/0696
251/129.19

(Continued)

FOREIGN PATENT DOCUMENTS

DE    20 2007 005 224 U1    8/2007
DE    10 2007 051 557 A1    4/2009

(Continued)

OTHER PUBLICATIONS

International Search Report corresponding to PCT Application No. PCT/EP2015/067774, dated Oct. 2, 2015 (German and English language document) (5 pages).

*Primary Examiner* — Matthew W Jellett
(74) *Attorney, Agent, or Firm* — Maginot, Moore & Beck LLP

(57) ABSTRACT

A valve armature assembly of a solenoid valve includes a body, a closing element, and an elastic damping element. The body includes a depression located at an end of the body. The closing element is received in the depression and includes a closing member configured to interact with a valve seat of the valve. The elastic element is positioned in the depression between the closing element and the body and is configured to damp a pulse resulting from the closing member striking the valve seat.

7 Claims, 2 Drawing Sheets

(56) References Cited

U.S. PATENT DOCUMENTS

| | | | | |
|---|---|---|---|---|
| 6,955,337 B2* | 10/2005 | Weber | ............... | F16K 31/0651 |
| | | | | 137/315.03 |
| 7,108,242 B2* | 9/2006 | Goossens | ............... | B60T 8/363 |
| | | | | 251/129.15 |
| 7,422,193 B2* | 9/2008 | Sisk | ............... | F16K 31/0655 |
| | | | | 251/129.15 |
| 7,828,265 B2* | 11/2010 | Sisk | ............... | F16K 31/0655 |
| | | | | 251/129.19 |
| 8,348,232 B2* | 1/2013 | Koyama | ............... | B60T 8/363 |
| | | | | 251/129.15 |
| 8,870,160 B2* | 10/2014 | Ambrosi | ............... | F16K 31/0665 |
| | | | | 251/129.15 |
| 8,925,897 B2* | 1/2015 | Alaze | ............... | B60T 8/363 |
| | | | | 251/129.19 |
| 2003/0067217 A1* | 4/2003 | Saenz | ............... | B60T 8/363 |
| | | | | 303/113.1 |
| 2004/0251738 A1 | 12/2004 | Kawa et al. | | |
| 2007/0069166 A1 | 3/2007 | Sisk et al. | | |
| 2008/0272208 A1* | 11/2008 | Anderson | ............... | B65D 83/262 |
| | | | | 239/302 |
| 2011/0147625 A1* | 6/2011 | Speer | ............... | B60T 8/363 |
| | | | | 251/129.15 |
| 2013/0043417 A1* | 2/2013 | Guggenmos | ............... | B60T 8/363 |
| | | | | 251/129.15 |
| 2016/0377190 A1* | 12/2016 | Speer | ............... | F16K 31/0696 |
| | | | | 251/129.15 |

FOREIGN PATENT DOCUMENTS

| | | |
|---|---|---|
| JP | 3-130977 U | 12/1991 |
| JP | 8-210547 A | 8/1996 |
| JP | 2004-286112 A | 10/2004 |

* cited by examiner

VALVE ARMATURE FOR A SOLENOID VALVE, AND VALVE CARTRIDGE FOR A SOLENOID VALVE

This application is a 35 U.S.C. § 371 National Stage Application of PCT/EP2015/067774, filed on Aug. 3, 2015, which claims the benefit of priority to Serial No. DE 10 2014 217 447.3, filed on Sep. 1, 2014 in Germany, the disclosures of which are incorporated herein by reference in their entirety.

FIELD OF INVENTION

The disclosure relates to a valve armature for a solenoid valve and to an associated valve cartridge for a solenoid valve.

BACKGROUND

The state of the art discloses normally open or normally closed solenoid valves, which are used as inlet valves or outlet valves in a hydraulic unit of a vehicle braking system, for example. The hydraulic unit serves for performing open and/or closed-loop control operations in an antilock braking system (ABS) or a traction control system (TCS) or an electronic stability program system (ESP) in order to build up or reduce pressure in corresponding wheel brake calipers. Such solenoid valves comprise a solenoid assembly and a valve cartridge, which comprises a pole body, a guide sleeve connected to the pole body, a valve armature having a closing element and axially moveable and guided inside the guide sleeve against the force of a return spring between a closed position and an open position, and a valve sleeve connected to the guide sleeve and having a valve seat. The valve seat is arranged between at least one first flow port and at least one second flow port. The closing element in the closed position has a sealing interaction with the valve seat and interrupts a fluid flow between at least the one first flow port and at least the one second flow port. In the open position the closing element is lifted off from the valve seat and allows the fluid flow between at least the one first flow port and at least the one second flow port. Energizing of the solenoid assembly generates a magnetic force, which in an unenergized, open solenoid valve moves the valve armature with the closing element from the open position into the closed position until the closing element meets the corresponding valve seat and seals the latter. In the unenergized state the return spring moves the valve armature with the closing element and the closing element lifts off from the valve seat and opens the latter. In an unenergized, closed solenoid valve the valve armature with the closing element is moved from the closed position into the open position by the energizing of the solenoid assembly and the closing element lifts off from the valve seat and opens the latter. If the current is switched off, the return spring moves the solenoid armature with the closing element in the direction of the valve seat until the closing element meets the valve seat and seals the latter. The solenoid valves described produce a so-called closing noise when the closing element, which comprises a hardened closing member that is embodied as a steel ball, for example, meets the valve seat likewise composed of hardened steel.

The published patent application DE 10 2007 051 557 A1, for example, describes a normally closed solenoid valve for a vehicle hydraulic braking system with wheel-slip control. The solenoid valve comprises a hydraulic part, also referred to as a valve cartridge, which is partially arranged in a stepped bore of a valve block, and an electrical part, which is substantially formed from a solenoid assembly, which is fitted onto the part of the valve cartridge projecting from the valve block. The solenoid assembly comprises a coil shell with an electrical winding, a coil casing that carries magnetic flux, and an annular disk that carries magnetic flux. The hydraulic part comprises a guide sleeve, which at its end facing the electrical part is closed by a pole body that is pressed in and welded so that it is fluid-tight. A longitudinally displaceable armature, which is supported by a return spring on the pole body, is accommodated in the guide sleeve. Remote from the pole body, the armature comprises a spherical closing member arranged in a depression. At the end remote from the pole body, a cupped valve sleeve having a cylindrical shell and a base is pressed into the guide sleeve. The valve sleeve has a passage on the base together with a hollow cone-shaped valve seat, which with the closing member forms a seat valve. The seat valve forms a controllable fluid connection between the passage on the base of the valve sleeve and at least one passage in the shell of the valve sleeve. A radial filter is moreover arranged externally on the shell of the valve sleeve, in order to filter dirt particles out of the fluid flow. The guide sleeve may be calked in the stepped bore of the valve block by means of a fixing bush.

SUMMARY

The valve armature for a solenoid valve according to the disclosure and the corresponding valve cartridge for a solenoid valve according to the disclosure by contrast have the advantage that modification of the valve armature reduces the closing noise that occurs during closing and in the best case is even capable of eliminating it almost entirely. Through the use of an elastic damping element between the closing member and the valve armature, it is possible to damp the pulse that occurs as the closing member strikes the valve seat, so that the structure-borne noise in the system can advantageously be reduced.

Embodiments of the present disclosure therefore help to improve the noise/vibration/harshness (NVH) properties of the vehicle by reducing and at best entirely preventing the intrusive noises occurring when the solenoid valve closes. It is thereby possible to design the vehicle braking system as a single-box system and to bolt the hydraulic unit directly to the splash wall of the vehicle, so that no intrusive closing noises can penetrate into the vehicle interior.

Embodiments of the present disclosure provide a valve armature for a solenoid valve, at one end of which a depression is arranged, which accommodates a closing element having a closing member and interacting with a valve seat. According to the disclosure an elastic damping element, which damps a pulse occurring as the closing member strikes the valve seat, is arranged between the closing member and the depression.

Furthermore, a valve cartridge for a solenoid valve is proposed, having a pole body, a guide sleeve connected to the pole body, a valve armature according to the disclosure which is coupled to a closing element and is axially moveable and guided inside the guide sleeve against the force of a return spring between a closed position and an open position, and a valve sleeve connected to the guide sleeve and having a valve seat, which is arranged between at least one first flow port and at least one second flow port. The closing element in the closed position has a sealing interaction with the valve seat and interrupts a fluid flow between at least the one first flow port and at least the one second flow port. In the open position the closing element is lifted off from the valve seat and allows the fluid flow between at least the one first flow port and at least the one second flow port.

Various aspects of the valve armature for a solenoid valve are provided by additional features of the descriptions, drawings, and claims.

It is particularly advantageous for the elastic damping element to be embodied as an elastomer disk. This affords an easy and cost-effective way of manufacturing the elastic damping element. For adjusting the damping characteristics of the elastic damping element, additional recesses may advantageously be provided on the disk-shaped damping element.

In a further advantageous development of the valve armature according to the disclosure the closing element may be embodied as an injection-molded plastic part, such as a polyether ether ketone component (PEEK component), for example. This advantageously affords an additional damping effect.

In a further advantageous development of the valve armature according to the disclosure the closing element may be held in the depression by retaining means. The retaining means may be formed as isolated or circumferential calking or flanging at the edge of the depression. The closing element and the elastic damping element are thereby captively retained in the armature before assembly of the valve armature.

In a further advantageous development of the valve armature according to the disclosure the depression may be embodied as a blind hole, wherein the damping element is arranged at the base of the blind hole. Furthermore, the closing element may comprise a body, the dimensions of which are matched to the dimensions of the depression. The body may be of a cylindrical, solid rectangular or cuboidal shape, for example. The closing element can thereby be guided in the depression virtually free of play. The closing member may furthermore be formed onto the body. The closing member may be embodied as a spherical cap, for example. The valve seat may be embodied, for example, as a hollow truncated cone.

The body may be of a cylindrical, solid rectangular or cuboidal shape, for example. The closing element can thereby be guided in the depression virtually free of play. The closing member may furthermore be formed onto the body. The closing member may be embodied as a spherical cap, for example. The valve seat may be embodied, for example, as a hollow truncated cone.

In a further advantageous development of the valve armature according to the disclosure the body may be formed as an elastic damping element. The body formed as an elastic element may comprise a socket, which accommodates the closing member. The closing member may be held in the socket of the body, for example, by hot deformation. Alternatively, the closing member may be held in the socket of the body by way of a clipped connection.

Exemplary embodiments of the disclosure are represented in the drawing and are explained in more detail in the following description. In the drawing the same reference numerals identify components or elements which perform the same or similar functions.

DETAILED DESCRIPTION

Figure 1:
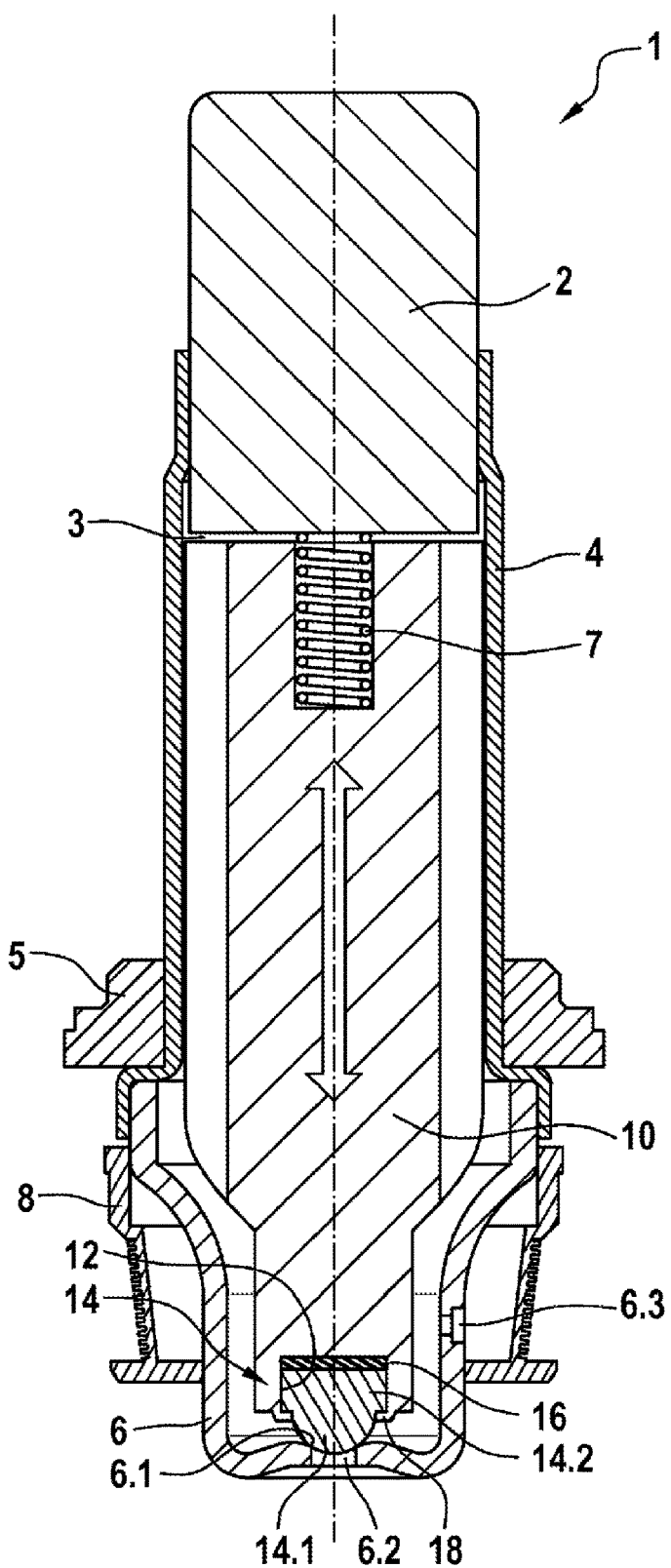
FIG. 1 shows a schematic, perspective sectional representation of an exemplary embodiment of a valve cartridge according to the disclosure for a solenoid valve with a first exemplary embodiment of a valve armature according to the disclosure.

As can be seen from FIG. 1, the exemplary embodiment represented of a valve cartridge 1 according to the disclosure for a solenoid valve comprises a pole body 2, a guide sleeve 4 connected to the pole body 2, a valve armature 10, which is axially moveable in the direction of the arrow and guided inside the guide sleeve 4 against the force of a return spring 7 between a closed position and an open position and which is coupled to a closing element 14, and a valve sleeve 6 connected to the guide sleeve 4 and having a valve seat 6.1, which is arranged between at least one first flow port 6.2 and at least one second flow port 6.3. On the energizing of a solenoid assembly, not shown in more detail, that is to say when an electrical current is applied to a coil winding of the solenoid assembly via electrical connections, a magnetic force generated causes the axially moveable valve armature 10 to move inside the guide sleeve 4 against the force of the return spring 7. The maximum possible stroke of the valve armature 10 or the closing element 14 is predefined by an air gap 3 between the pole body 2 and the valve armature 10. As can further be seen from FIG. 1, the closing element 14 in the closed position shown has a sealing interaction with the valve seat 6.1 and interrupts a fluid flow between at least the one first flow port 6.2 and at least the one second flow port 6.3. In an open position, not shown in more detail, the closing element 14 is lifted off from the valve seat 6.1 and allows the fluid flow between at least the one first flow port 6.2 and at least the one second flow port 6.3.

Figure 2:
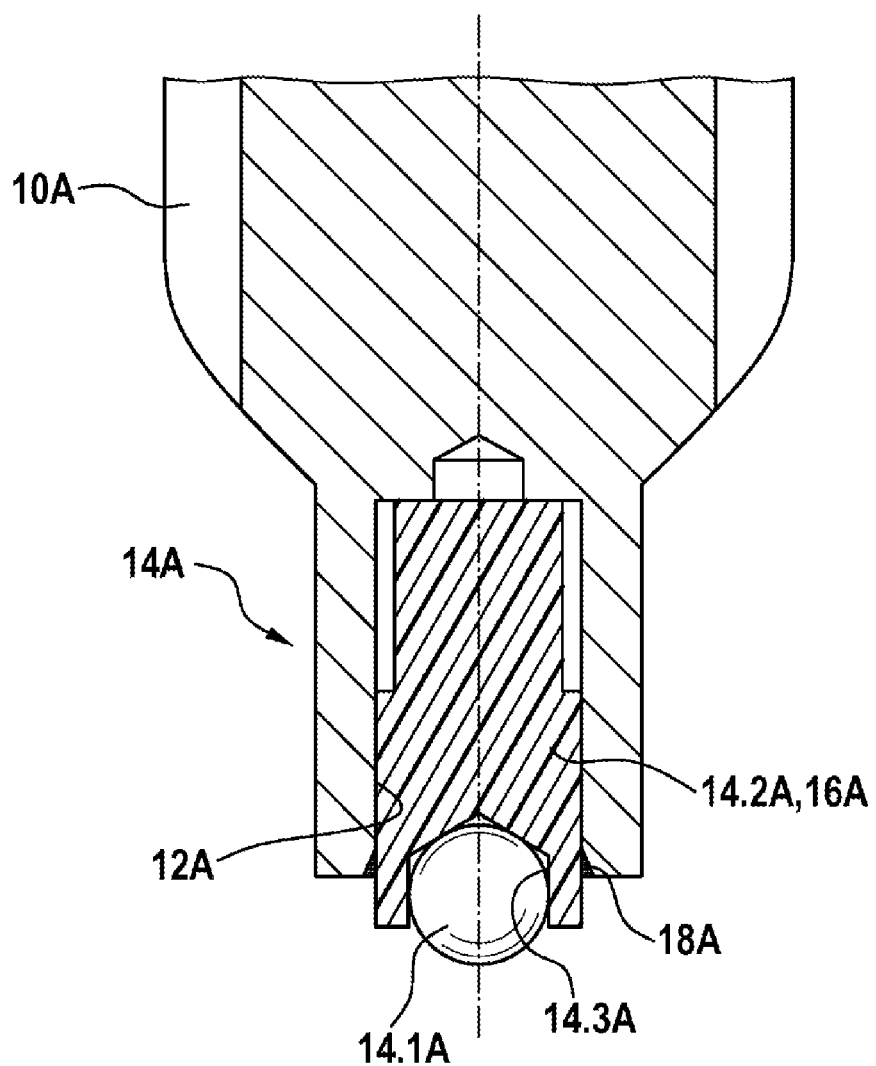
FIG. 2 shows a schematic, perspective sectional representation of a second exemplary embodiment of a valve armature according to the disclosure.

As can further be seen from FIGS. 1 and 2, a depression 12, 12A, which at least partially accommodates the closing element 14, 14A, having a closing member 14.1, 14.1A and interacting with the valve seat 6.1, is arranged at one end of the valve armature 10, 10A. According to the disclosure an elastic damping element 16, 16A, which damps a pulse occurring as the closing member 14.1, 14.1A strikes the valve seat 6.1, is arranged between the closing member 14.1, 14.1A and the depression 12, 12A.

In the first exemplary embodiment of the valve armature 10 according to the disclosure represented in FIG. 1, the elastic damping element 16 is embodied as an elastomer disk. The elastic damping element 16 embodied as an elastomer disk is inserted into the depression 12 in the valve armature 10. For varying the damping properties, the damping element may additionally be provided with recesses. In order to obtain an additional damping effect, the closing element 14 may be formed as an injection-molded plastic part, such as a PEEK part, for example. As can further be seen from FIG. 1, the closing element 14 is held in the depression 12 by retaining means 18 in the form of circumferential calking or flanging at the edge of the depression 12. Alternatively, isolated calking or flanging may be provided at multiple points at the edge of the depression 12. Thus, at three points, which are arranged uniformly spaced at the edge of the depression 12, for example, isolated calking or flanging may be provided as retaining means 18, in order to hold the closing element 14 in the depression 12.

As can further be seen from FIG. 1, the depression 12 in the exemplary embodiment shown is embodied as a blind hole, at the base of which the damping element 16 is arranged. In the first exemplary embodiment represented the closing element 14 comprises a cylindrical body 14.2, the dimensions of which are matched to the dimensions of the depression 12. Moreover, a spherical cap-shaped closing member 14.1 is formed onto the body 14.2. Other suitable geometrical shapes may naturally also be used for the depression 12 and the closing element 14. Thus the body 14.2 may also be of a solid rectangular or cuboidal shape, for example, and the closing member 14.1 may be embodied, for example, as a cone or truncated cone.

In the second exemplary embodiment of the valve armature 10A according to the disclosure represented in FIG. 2, the body 14.2A of the closing element 14A is formed as an elastic damping element 16A. The body 14.2A may be embodied as an elastic injection-molded plastic part, for example. Here the body 14.2A comprises a socket 14.3A, which accommodates the closing member 14.1A. The closing member 14.1A, for example, may be produced as a ball, cone or truncated cone, preferably from hardened steel. The closing member 14.1A may be held in the socket 14.3A of the body 14.2A by hot deformation or by a clipped connection, for example. In a manner similar to the first exemplary embodiment, the depression 12A in the second exemplary embodiment shown is likewise embodied as a blind hole. As in the first exemplary embodiment, the closing element 14A is held in the depression 12A by retaining means 18A embodied as circumferential calking or flanging at the edge of the depression 12A. Alternatively, isolated calking or flanging may be provided at multiple points at the edge of the depression 12A.

As can further be seen from FIG. 1, the valve cartridge 1 with the first or second exemplary embodiment of the valve armature 10, 10A may be calked by way of a valve bushing 5 in a corresponding seating bore of a hydraulic block not further represented. Moreover, a radial filter 8 is arranged in the area of at least the one second flow port 6.3 in the valve sleeve 6, in order to filter dirt particles out of the fluid flow.

The exemplary embodiment shown relates to a valve cartridge 1 for a normally closed solenoid valve. The valve armature 10, 10A according to the disclosure may also be used, however, for a valve cartridge of a normally open solenoid valve, not shown further, in order to damp the closing noise.

Embodiments of the present disclosure provide a valve armature and a valve cartridge for a solenoid valve, which through the use of an elastic damping element between the closing member of a closing element and a depression in the valve armature advantageously damp the pulse occurring as the closing member strikes the valve seat, and thus reduce the structure-borne noise in the vehicle.

The invention claimed is:

1. A valve armature assembly for a solenoid valve, comprising:
   an armature body that defines a depression located in one end of the armature body;
   a closing element received in the depression and including a closing member configured to interact with a valve seat; and
   an elastic damping element that is a separate structure from the closing member and is positioned in the depression between the closing member and the armature body, the elastic damping element being configured and arranged to damp pulses resulting from the closing member striking the valve seat,
   wherein the elastic damping element is an elastomer disk, and
   wherein the elastic damping element includes a plurality of recesses.

2. The valve armature assembly as claimed in claim 1, wherein the closing element is an injection-molded plastic part.

3. The valve armature assembly as claimed in claim 1, further comprising at least one retaining element that holds the closing element in the depression.

4. The valve armature assembly as claimed in claim 3, wherein the at least one retaining element is either (i) an isolated calking, (ii) a circumferential calking, or (iii) a flanging located at an edge of the depression.

5. The valve armature assembly as claimed in claim 1, wherein:
   the depression is a blind hole; and
   the elastic damping element is positioned at a base of the blind hole.

6. The valve armature assembly as claimed in claim 1, wherein at least a portion of a closing element body of the closing element has dimensions matched to dimensions of at least a portion of the depression.

7. The valve armature assembly as claimed in claim 6, wherein the closing member is integrally formed onto the closing element body.

* * * * *